United States Patent [19]

Brunson et al.

[11] 3,725,688
[45] Apr. 3, 1973

[54] DIGITAL SUBTRACTION DEVICE

[75] Inventors: Glenn S. Brunson; Robert N. Curran; Franklin H. Just, all of Idaho Falls, Idaho

[73] Assignee: The United States of America as represented by the United States Atomic Energy Commission

[22] Filed: Sept. 3, 1971

[21] Appl. No.: 177,599

[52] U.S. Cl. ............................ 235/176, 235/92 EV
[51] Int. Cl. ......................... G06f 7/385, G06f 7/38
[58] Field of Search ............ 235/92 EV, 92 PL, 176

[56] References Cited

UNITED STATES PATENTS 3,500,023  3/1970  Arrowood et al. ............ 235/92 PL
3,549,870  12/1970  Lay .............................. 235/92 PL
3,414,718  12/1968  McElroy ....................... 235/92 PL Primary Examiner—Malcolm A. Morrison
Assistant Examiner—James F. Gottman
Attorney—Roland A. Anderson

[57] ABSTRACT

This circuit acts to subtract a first series of pulses from a second series of pulses. The second series of pulses is coupled directly to an output terminal of the circuit until a first series pulse is counted in one direction by an up-down counter. With a count greater than zero in the up-down counter, the second series of pulses is coupled thereto to count in the opposite direction. With the up-down counter having a count greater than zero, the second series of pulses are also blocked from the output terminal of the subtraction device.

3 Claims, 3 Drawing Figures

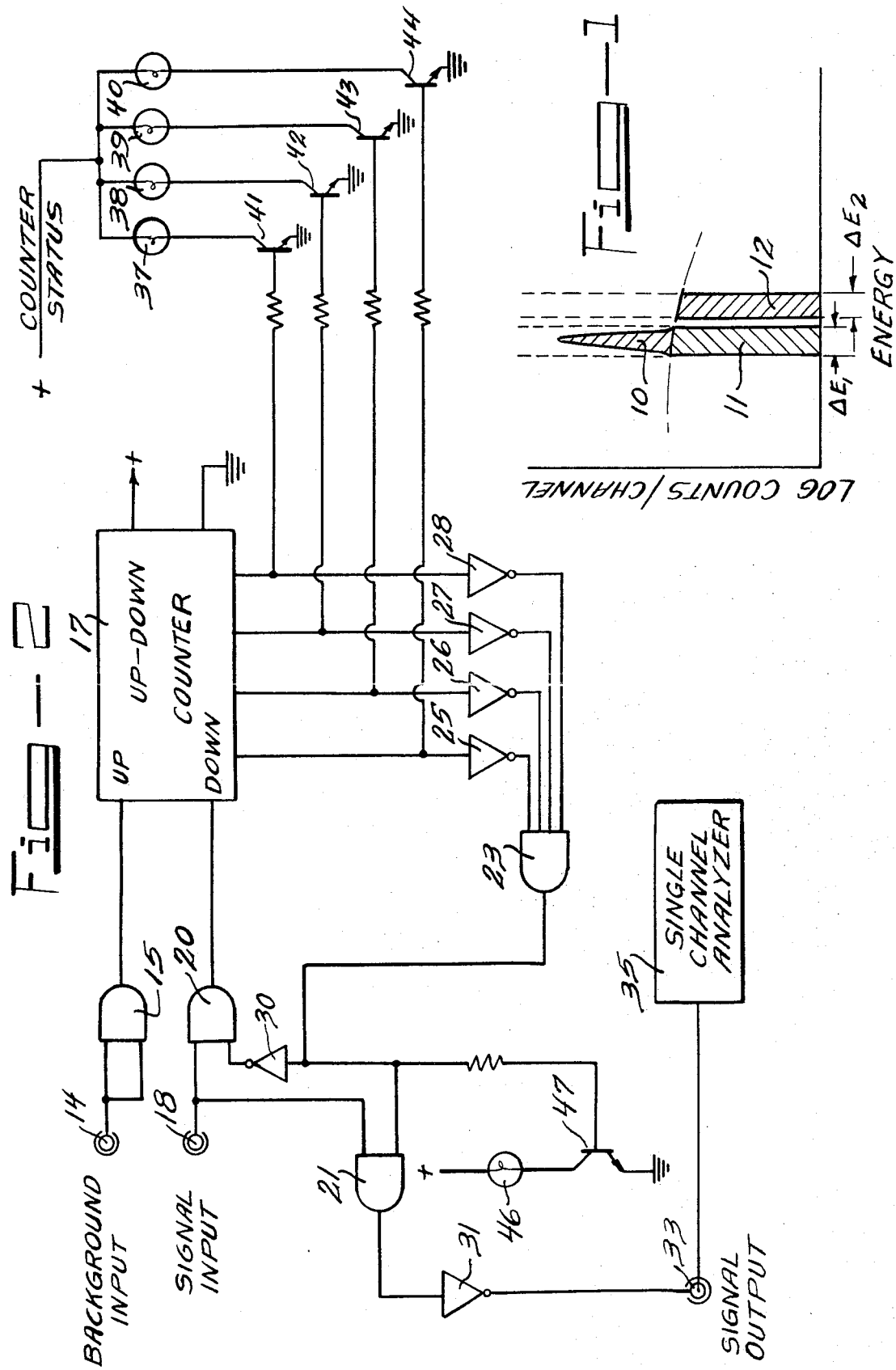

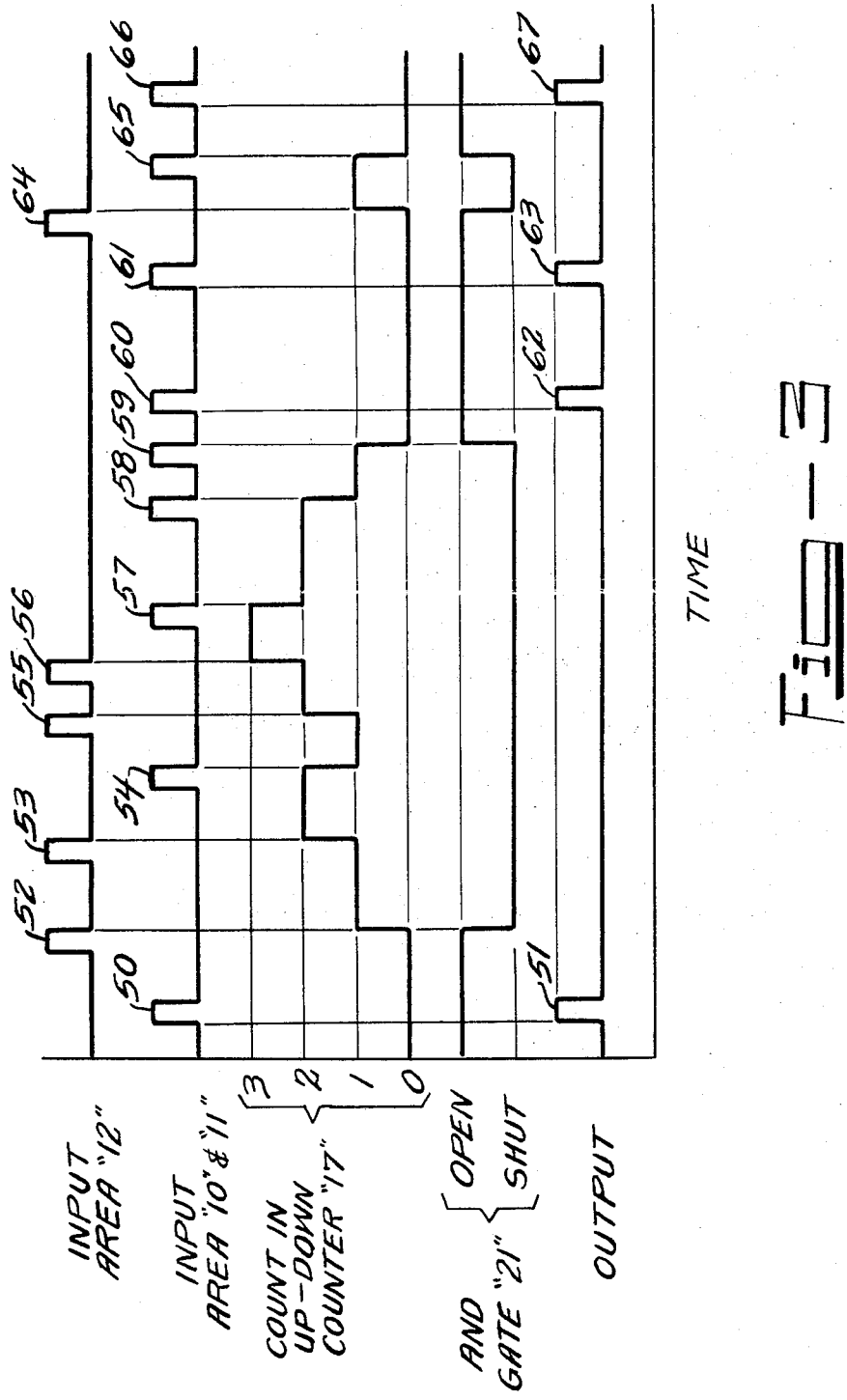

DIGITAL SUBTRACTION DEVICE

CONTRACTUAL ORIGIN OF THE INVENTION

The invention described herein was made in the course of, or under, a contract with the UNITED STATES ATOMIC ENERGY COMMISSION.

BACKGROUND OF THE INVENTION

In many measuring circuits, it is desirable to subtract a series of pulses from another series of pulses in order to arrive at a resultant which is a function of the parameter being measured. An example of this is the monitoring of the individual lines of the gamma spectrum by a single-channel analyzer. The gamma detectors are arranged so that the background spectra are detected by one detector while the particular line of interest plus the background are detected by a second detector. In order to measure the line of interest, it is necessary to subtract the background from the background plus line measurement. This can be accomplished by using separate analyzers to record the events and then subtracting manually. This requires an additional analyzer and a manual operation which is time-consuming. It is also possible to use an up-down counter in which the background is used to count down while the line plus background counts up. While this form of operation would be satisfactory in performing the measurement, it involves the use of an up-down counter which has a very large storage capacity. This type of counter is expensive and complex.

It is therefore an object of this invention to provide a digital subtraction unit which can use a readily available single-channel analyzer to record events and which will subtract one series of pulses from another series of pulses.

BRIEF DESCRIPTION OF THE INVENTION

In practicing this invention, a first series of pulses is subtracted from a second series of pulses. A small-capacity up-down counter receives the first series of pulses which cause the counter to count in one direction from zero. A gating circuit is provided which receives the second series of pulses and gates the second series of pulses to an output terminal as long as the up-down counter is at zero. With the up-down counter at a number greater than zero, the gating circuit acts to block the second series of pulses from the output terminal and directs the second series of pulses to the up-down counter to count down to zero. Through this circuit, each of the pulses received in the first series must be counterbalanced by a pulse from the second series before the pulses of the second series can be directed to the output terminal. Thus the pulses in the first series are subtracted from the pulses in the second series.

BRIEF DESCRIPTION OF THE DRAWINGS

The invention is illustrated in the drawings, of which:
FIG. 1 shows the gamma spectrum analysis with which this invention is useful;
FIG. 2 is a block diagram of the circuit of this invention; and
FIG. 3 is the pulse diagram illustrating the operation of the circuit of FIG. 2.

DETAILED DESCRIPTION OF THE INVENTION

For operational purposes, individual lines of the gamma spectrum are to be monitored by single-channel analyzers. Ideally this should be done with a minimum of interference from the Compton continuum of any gamma lines of higher energy. In FIG. 1, area 10 represents the count rate of interest while area 11 is the background largely due to Compton gammas coming from higher energy primary gammas. Area 11 can therefore fluctuate independently of area 10, causing degradation and possible effective loss of any count rate information derived from the single-channel analyzer set to count in the energy window $\Delta E_1$.

A second single-channel analyzer can be set for energy window $\Delta E_2$ at such a place in the spectrum that area 12 is a good approximation of area 11. If, then, the pulse train associated with $\Delta E_2$ is subtracted from that associated with $\Delta E_1$, there is left a pulse train representing fairly accurately area 10 and effectively independent of changes in the background. This resultant pulse train is consequently an effective representation of the activity of the particular isotope producing the spectral peak of interest.

Referring to FIG. 2, there is shown a circuit which performs the subtraction so that only one single-channel analyzer is required as the pulse train representing area 12 and is subtracted from the pulse train representing areas 10 and 11 before the pulse train is recorded by a single-channel analyzer. The background input pulse train representing area 12 is applied to the input terminal 14 and coupled through AND gate 15 to the up-down counter 17. The pulse train representing the areas 10 and 11 is coupled to the signal input terminal 18 and coupled to AND gates 20 and 21. Each stage of the up-down counter 17 is coupled to AND gate 23 through the inverters 25-28. With all of the stages of up-down counter 17 in the zero state, a first control signal is developed at the output of AND gate 23 which is coupled to AND gate 20 and to AND gate 21 through inverter 30. The first control signal acts to enable AND gate 21 and disable AND gate 20. Thus with the count in up-down counter 17 at zero, all of the pulses applied to terminal 18, which represent areas 10 plus 11, are applied through enabled AND gate 21 and inverter 31 to the signal output terminal 33 and a single-channel analyzer 35 to be counted. When a background pulse representing area 12 is received, up-down counter 17 counts up one number. As long as the up-down counter 17 is at a number greater than zero, a second control signal is developed by AND gate 23 which disables AND gate 21 and enables AND gate 20. At this point, the signal pulses representing the areas 10 plus 11 are applied to up-down counter 17 to count down towards zero. None of the signal pulses representing areas 10 plus 11 applied to up-down counter 17 are received by single-channel analyzer 35 and thus are effectively subtracted from the signal input train of pulses. Thus any of the background input pulses count the up-down counter 17 upward, leaving a "debit" which must be "paid off" pulse by pulse from the signal input.

Signal lamps 37-40 and transistors 41-44 are used to indicate the status of the various stages of up-down counter 17. Signal lamp 46 and transistor 47 are used to indicate the status of AND gate 21.

Referring to FIG. 3, there is shown a pulse diagram illustrating the operation of the invention. In the illustration of FIG. 3, the first pulse received represents the area 10 plus 11 with a zero count in up-down counter 17. This pulse, pulse 50, is counted out at the output as pulse 51. The second pulse to be received, 52, represents area 12 and is applied directly to up-down counter 17 to count the counter to count one. The next pulse received, 53, is from area 12 and counts up-down counter 17 to count two. The next pulse received, 54, is from area 10 plus 11 and counts up-down counter 17 down one count. However, since up-down counter 17 is not at zero, pulse 54 does not reach the output terminal. The next two pulses received, 55 and 56, are from the area 12 and act to count up-down counter 17 upwards. The following pulses, 57, 58 and 59, are from the area 10 plus 11 and act to count up-down counter 17 down to zero. However, since up-down counter 17 is not at zero during the receipt of any of these pulses, they do not go to the output terminal 33 through AND gate 21. Pulses 60 and 61 are from the area 10 plus 11 and are shunted to the output terminal 33 as pulses 62 and 63, since up-down counter 17 is at zero and AND gate 21 is open. The next pulse, 64, is from the background area 12 and acts to step up-down counter 17 to the first count. The following pulse, 65, from the area 10 plus 11 acts to step up-down counter 17 down to zero. However, since up-down counter 17 was not at zero, pulse 65 does not appear at the output. The following pulse, 66, from the area 10 plus 11 is coupled to the output terminal as pulse 67 as up-down counter 17 is in the zero state and AND gate 21 is open. In the example in FIG. 3, nine signal input pulses representing the area 10 plus 11 have been received and five pulses from the background area 12 have been received. The difference between the two signals, 9 − 5 = 4, equals the number of pulses appearing at the output of the subtraction unit.

The embodiments of the invention in which an exclusive property or privilege is claimed are defined as follows:

1. A circuit for subtracting a first series of pulses from a second series of pulses comprising, output terminal means, a first input terminal for receiving said first series of pulses and a second input terminal for receiving said second series of pulses, bidirectional counter means responsive to a zero count therein to develop a first control signal and to a count therein different from zero to develop a second control signal, said bidirectional counter means being coupled to said first input terminal to receive said first series of pulses therefrom and to count in a first direction in response thereto, a first AND gate having a first input coupled to said bidirectional counter means for receiving said first and second control signals and a second input coupled to said second input terminal for receiving said second series of pulses, said first AND gate further having an output coupled to said bidirectional counter means, a second AND gate having one input coupled to said bidirectional counter means for receiving said first and second control signals and a second input coupled to said second input terminal for receiving said second series of pulses, said second AND gate further having an output coupled to said output terminal, said first control signal acting to disable said first AND gate and enable said second AND gate so that said second series of pulses is directed to said output terminal, said second control signal acting to enable said first AND gate and disable said second AND gate so that said second series of pulses is directed to said bidirectional counter means, said bidirectional counter means being responsive to said second series of pulses to count in a second direction opposite to said first direction.

2. The subtracting circuit of claim 1 wherein, said counter means includes a plurality of binary stages with each of said binary stages having a 0 state and a 1 state, said bidirectional counter means further including a third AND gate having inputs coupled to each of said binary states and an output coupled to said first and second AND gates, said third AND gate being responsive to said states of said binary stages to develop said first control signal with all of said binary stages being in a 0 state and to develop said second control signal with at least one of said binary stages being in a 1 state.

3. The subtracting circuit of claim 2 further including, output counter means coupled to said output terminal to count said second series of pulses coupled to said output terminal.

* * * * *